United States Patent [19]
LaForgia

[11] Patent Number: 6,152,567
[45] Date of Patent: Nov. 28, 2000

[54] COMPUTER MONITOR PRIVACY PARTITION

[76] Inventor: Laura E. LaForgia, 195 N. Village Ave., #21H, Rockville Centre, N.Y. 11570

[21] Appl. No.: 09/494,344

[22] Filed: Jan. 28, 2000

[51] Int. Cl.[7] .................. G01B 27/00; G01B 21/00
[52] U.S. Cl. .................. 359/609; 359/601; 359/612
[58] Field of Search ........................ 359/601–614, 359/809, 900; 348/823, 824, 832–844; 379/451–453; 345/905

[56] References Cited

U.S. PATENT DOCUMENTS

| | | | |
|---|---|---|---|
| 5,048,928 | 9/1991 | Davis | 359/601 |
| 5,218,474 | 6/1993 | Kirschner | 359/601 |
| 5,233,468 | 8/1993 | McNulty | 359/601 |
| 5,243,463 | 9/1993 | Waintroob | 359/601 |
| 5,448,405 | 9/1995 | Clausen et al. | 359/609 |
| 5,877,896 | 3/1999 | Gremban | 359/601 |
| 6,046,754 | 4/2000 | Stanek | 345/905 |

*Primary Examiner*—Thong Nguyen
*Attorney, Agent, or Firm*—Henderson & Sturm LLP

[57] ABSTRACT

A partition for a computer monitor including a support panel releasably attached by hook and loop fasteners to the monitor casing sidewalls, and a privacy panel that is slidable movable between a retracted position and an extended position forward of the monitor screen. The positioning of the monitor on the desk and direction of human traffic determines whether the partition is needed on the right side, the left side, or both.

14 Claims, 1 Drawing Sheet

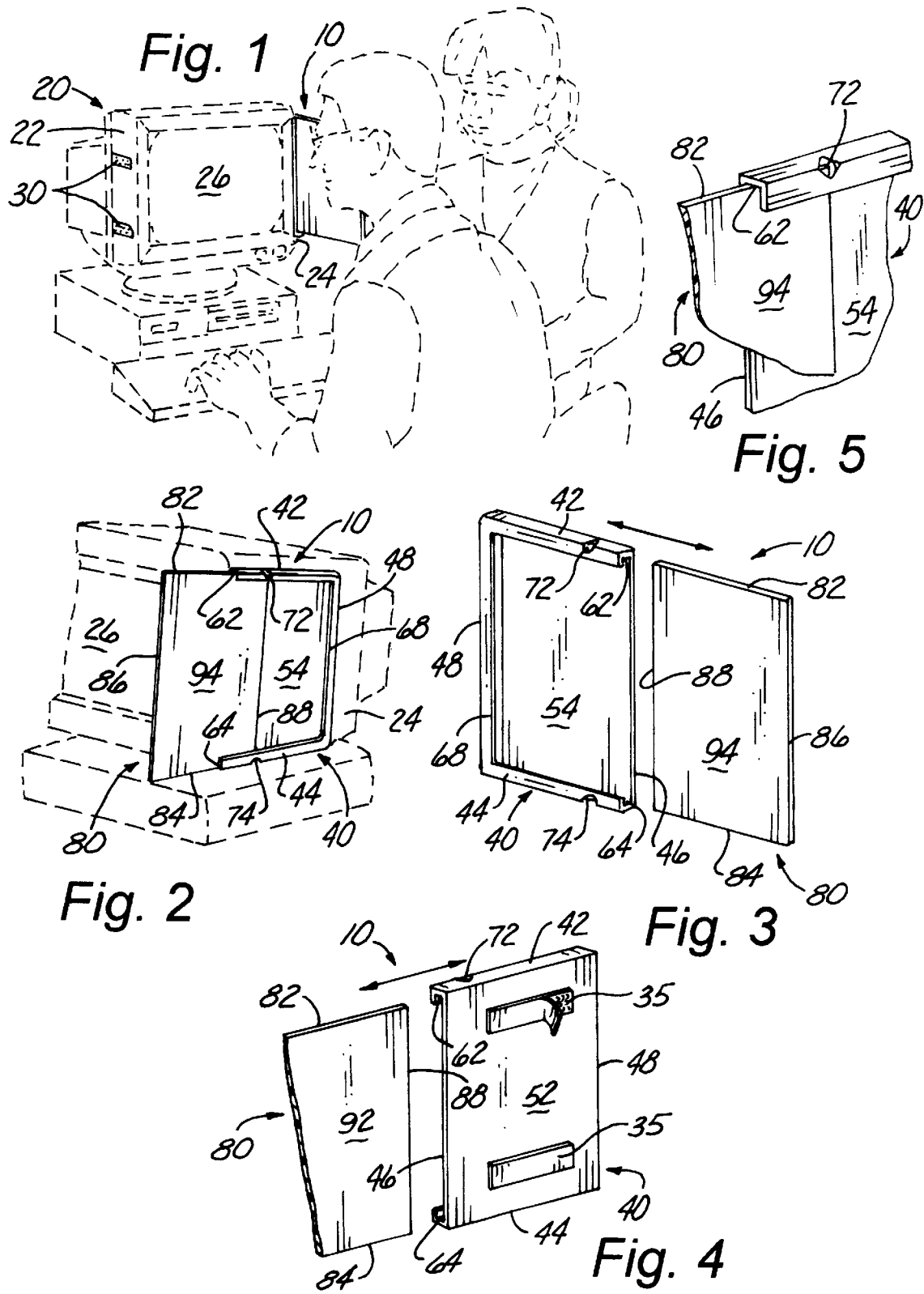

COMPUTER MONITOR PRIVACY PARTITION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of computer accessories, and more particularly to a privacy partition for a computer monitor.

2. Description of Related Art

As can be seen by reference to the following U.S. Pat. Nos. 5,218,474; 5,233,468; 5,243,463 and 5,877,896 the prior art is replete with myriad and diverse computer monitor visors.

While all of the aforementioned prior art constructions are more than adequate for the basic purpose and function for which they have been specifically designed, they are uniformly deficient with respect to their failure to provide a simple, efficient, and practical computer monitor privacy partition.

As a consequence of the foregoing situation, there has existed a longstanding need for a new and improved computer monitor privacy partition and the provision of such a construction is a stated objective of the present invention.

BRIEF SUMMARY OF THE INVENTION

Briefly stated, the present invention provides a partition for a computer monitor including a support panel releasably attached by hook and loop fasteners to the monitor casing sidewalls, and a privacy panel that is slidably movable between a retracted position and an extended position forward of the monitor screen. The positioning of the monitor on the desk and direction of human traffic determines whether the partition is needed on the right side, the left side, or both.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the monitor partition of the present invention used in a typical situation;

FIG. 2 is a perspective view of the partition attached to the right side of the monitor with the privacy panel extended;

FIG. 3 is an exploded perspective view of the outer face of the partition as it would attach to the left side of the monitor;

FIG. 4 is an exploded perspective view of the inner face of the partition; and

FIG. 5 is a partial perspective view illustrating the privacy panel extended to the point where the view opening in the track aligns with the rear of the privacy panel.

DETAILED DESCRIPTION OF THE INVENTION

As can be seen by reference to the drawings, and in particularly to FIG. 1, the computer monitor privacy partition that forms the basis of the present invention is designated generally by the reference number 10. The privacy partition 10 is adapted for use in combination with a computer monitor 20 including left and right sidewalls 22, 24 and a screen 26. Hook and loop fastener strips 30 are attached to the sidewalls 22, 24.

The privacy partition 10 includes a support panel 40 having a top 42, a bottom 44, a front 46, a rear 48, an inner face 52, and outer face 54, a top track 62, a bottom track 64, a stop member 68, and view openings 72, 74 formed through the top and bottom tracks 62, 64. Hook and loop fastener strips 35 are attached to the inner face 52 of the support panel 40 and are disposed to selectively releasably engage the fastener strips 30 on the monitor sidewalls 22, 24.

A privacy panel 80 includes a top 82, a bottom 84, a front 86, a rear 88, an inner face 92, and an outer face 94. The top and bottom 82, 84 of the privacy panel 80 slidably engage the top and bottom tracks 62, 64 of the support panel 40. The privacy panel 80 is thus movable between a retracted position where the rear 88 of the privacy panel 80 contacts and is retained by the stop member 68, and an extended position where the front 86 of the privacy panel 80 extends forward of the monitor screen 26. The view openings 72, 74 near the front of the support panel 40 guide the user from extending the privacy panel 80 too far forward.

The purpose of the invention is to block the view of the screen 26 to someone positioned at the side of the monitor 20. The partition 10 obstructs the view of someone positioned to the side, but does not interfere with the view of the person using the computer monitor 20. The positioning of the monitor on the desk and direction of human traffic determines whether a right side partition, left side partition, or both are needed.

The sliding privacy panel 80 allows the user to fully extend the panel 80 when privacy is needed, and to push it back when not needed. The partition 10 can be made in a few sizes to accommodate the most popular size monitors on the market. The height of the support panel 40 will be high enough to match the height of the viewing screen 26. This is to insure that when the privacy panel 80 is extended it is high enough to obstruct the view of the entire height of the viewing screen 26 from a vantage point at the side of the monitor 20. When the privacy panel 80 is fully extended, it will extend out a few inches past the front of the monitor 20. The distance extended is adjustable to the user's needs. Each partition 10 will be made for use on either side of the monitor 20. The Velcro® fasteners will allow the partition 10 to be easily removed from the monitor 20.

As shown in FIG. 1, someone standing or sitting to the right of the monitor 20 would not be able to see the computer screen 26. This is great for people who work in a job where customers regularly approach their desk for assistance. It is also good for people who keep their monitors positioned near a doorway since the partition 10 obstructs the view of those passing by. Since the partition 10 is relatively simple to manufacture, it allows an affordable alternative to other methods of insuring privacy.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed:

1. A partition for use in combination with a computer monitor having a casing including spaced vertical left and right sidewalls and a screen disposed intermediate the sidewalls, the partition comprising:

a first fastener member attached to at least one of the left and right sidewalls of the monitor casing;

a support panel having a top, a bottom, a front, a rear, an inner face, an outer face, and horizontally disposed spaced tracks attached to the top and bottom of the panel and disposed to extend out from the outer face thereof;

a second fastener member attached to the inner face of the support panel, the second fastener member being complementary to the first fastener member and being disposed to selectively engage the first fastener member to releasably attach the support panel to one of the left and right sidewalls of the monitor casing; and a privacy panel having a top, a bottom, a front, a rear, an inner face and an outer face, the top and bottom of the privacy panel being disposed to engage the spaced tracks extending out from the outer face of the support panel, the privacy panel being selectively slidable movable between a retracted position and an extended position disposed forward of the front of the support panel and the monitor screen.

2. The partition of claim 1 wherein the first fastener member is one of a hook and loop fastener, and the second fastener member is the other of the hook and loop fastener.

3. The partition of claim 2 further including a stop member attached to the rear of the support panel and disposed to extend out from the outer face thereto, the stop member being disposed to contact and restrain the rear of the privacy panel when it is in the retracted position.

4. The partition of claim 3 wherein the first fastener member is attached to each of the left and right sidewalls of the monitor casing.

5. The partition of claim 2 further including a view opening formed through each of the tracks near the front of the support panel.

6. The partition of claim 5 wherein the first fastener member is attached to each of the left and right sidewalls of the monitor casing.

7. The partition of claim 2 wherein the first fastener member is attached to each of the left and right sidewalls of the monitor casing.

8. The partition of claim 1 further including a stop member attached to the rear of the support panel and disposed to extend out from the outer face thereto, the stop member being disposed to contact and restrain the rear of the privacy panel when it is in the retracted position.

9. The partition of claim 8 further including a view opening formed through each of the tracks near the front of the support panel.

10. The partition of claim 9 wherein the first fastener member is attached to each of the left and right sidewalls of the monitor casing.

11. The partition of claim 8 wherein the first fastener member is attached to each of the left and right sidewalls of the monitor casing.

12. The partition of claim 1 further including a view opening formed through each of the tracks near the front of the support panel.

13. The partition of claim 12 wherein the first fastener member is attached to each of the left and right sidewalls of the monitor casing.

14. The partition of claim 1 wherein the first fastener member is attached to each of the left and right sidewalls of the monitor casing.

* * * * *